United States Patent [19]

Karklin et al.

[11] Patent Number: 4,676,938

[45] Date of Patent: Jun. 30, 1987

[54] DIFFERENTIAL PRESSURE THERMOFORMING AND FOAM INJECTION PROCESS AND APPARATUS

[75] Inventors: Roland Karklin, Beaverton; Albert W. Arends, Gladwin; Terrance L. Brokoff, Gladwin; Edward J. Russell, Gladwin; James R. Greiner, Gladwin, all of Mich.

[73] Assignee: John Brown, Inc., Beaverton, Mich.

[21] Appl. No.: 819,047

[22] Filed: Jan. 15, 1986

[51] Int. Cl.⁴ .............................................. B29C 65/00
[52] U.S. Cl. .................................. 264/46.5; 264/46.8; 425/112; 425/123; 425/126 R; 425/129 R; 425/190
[58] Field of Search ........................ 264/41, 45.1, 46.4, 264/46.5, 46.6, 46.7, 46.8, DIG. 83, 53; 425/4 R, 110, 112, 113, 114, 117, 123, 125, 126 R, 127, 129 R, 182, 188, 190, 193, 543, 383, 384, 388, 817 R, DIG. 201

[56] References Cited

U.S. PATENT DOCUMENTS

| | | | |
|---|---|---|---|
| 3,779,687 | 12/1973 | Alesi | 425/388 |
| 3,988,789 | 11/1976 | Blount | 264/45.5 |
| 4,191,523 | 3/1980 | Niederst et al. | 425/817 R |
| 4,276,254 | 6/1981 | Combronde | 425/112 |
| 4,278,629 | 7/1981 | Bennett | 264/46.8 |
| 4,420,447 | 12/1983 | Nakashima | 264/46.8 |
| 4,439,123 | 3/1984 | Sano et al. | 425/112 |
| 4,508,499 | 4/1985 | Spengler | 425/112 |
| 4,515,543 | 5/1985 | Hammer | 425/112 |
| 4,545,752 | 10/1985 | Hanamoto et al. | 425/112 |

Primary Examiner—Jay H. Woo
Assistant Examiner—J. Fortenberry
Attorney, Agent, or Firm—Learman & McCulloch

[57] ABSTRACT

A differential pressure thermoforming machine has a female mold with a female mold cavity, and an opposing mold, with a mold closing portion cooperable therewith. A foam injection head is perimetrally separated from the mold closing portion and is provided on the opposing mold. When the molds are initially closed, a differential pressure is created in the molds to cause the heated plastic sheet to move into contact with the mold cavity and form a configured pocket in the sheet. Mechanism is provided for releasing the plastic sheet from the carriage in which it has been moved between the molds, after the molding operation, to the cavity in the female mold, after which the molds are restored to spread-apart position. Mechanism is then activated to move the opposing mold to a position in which the foam injection head is now aligned with the female mold, whereupon the molds are again closed to bring the injection head into the pocket, whereupon the foam injection head is operated to charge a settable foam material to the pocket formed.

13 Claims, 17 Drawing Figures

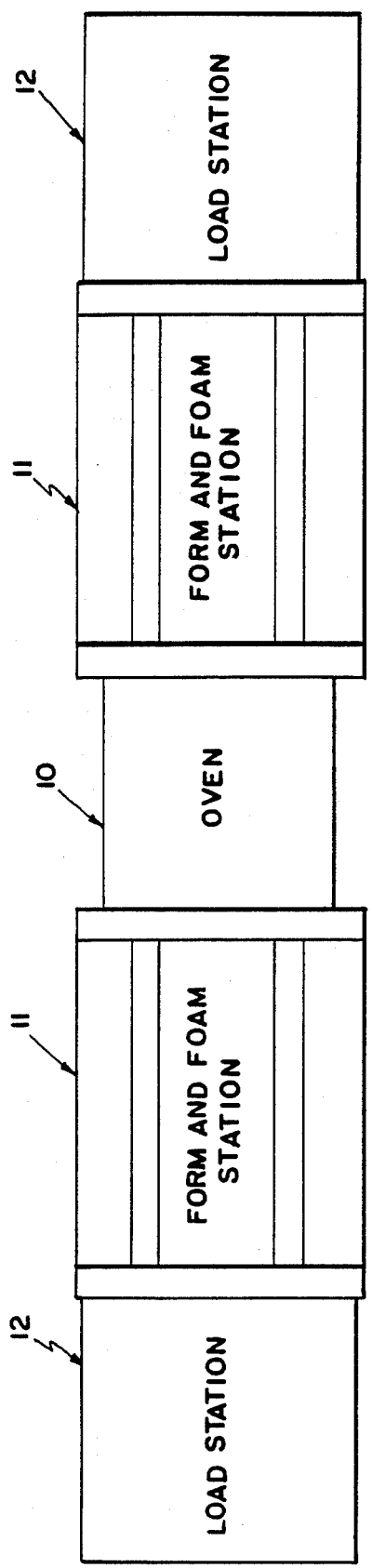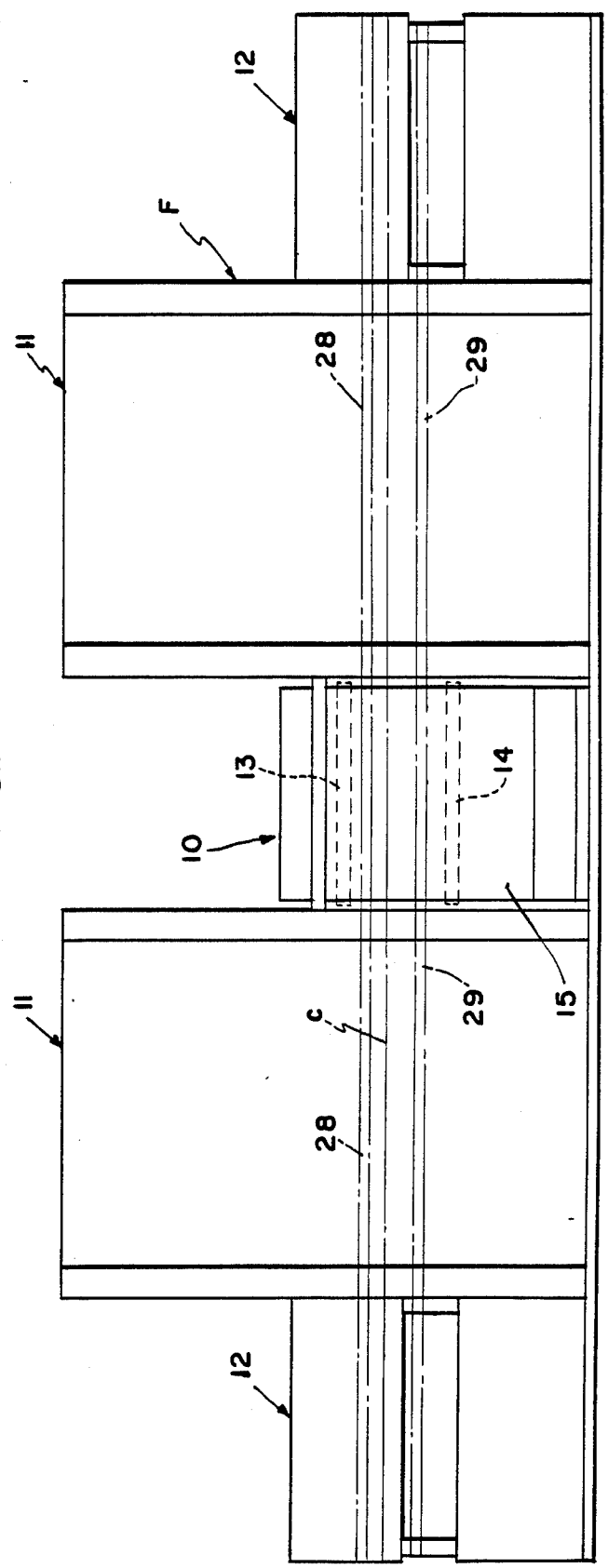

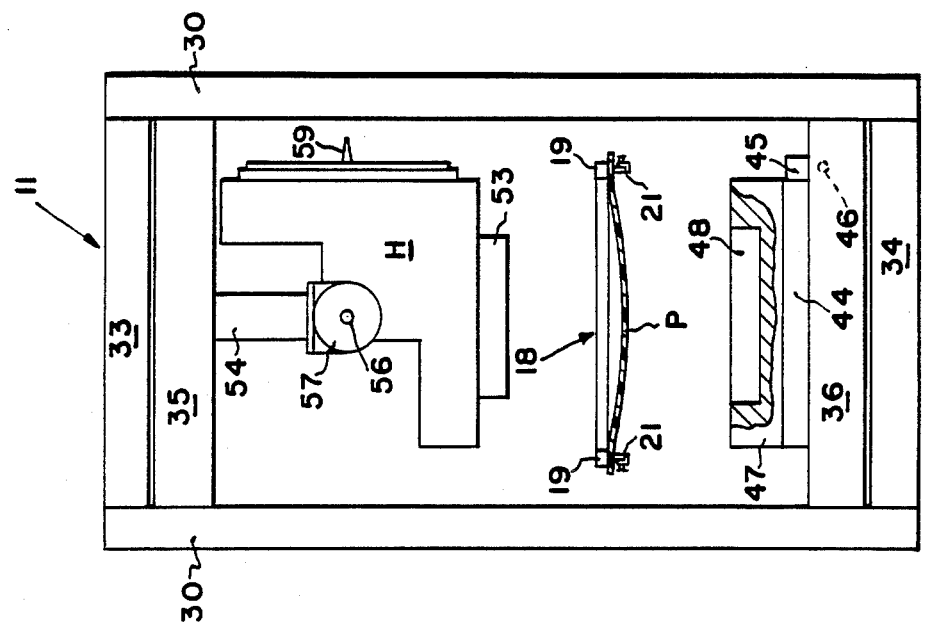
FIG.8
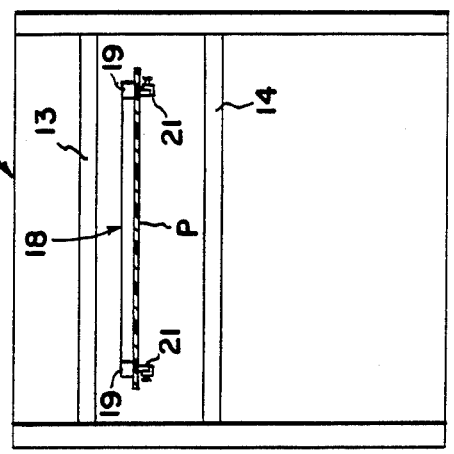
FIG.7
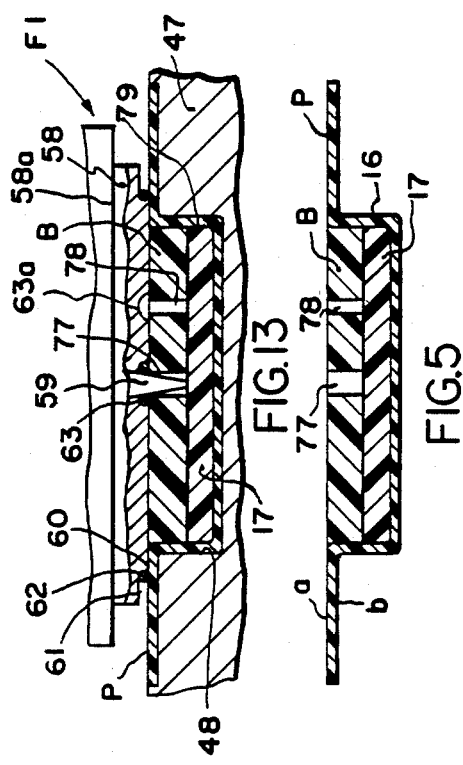
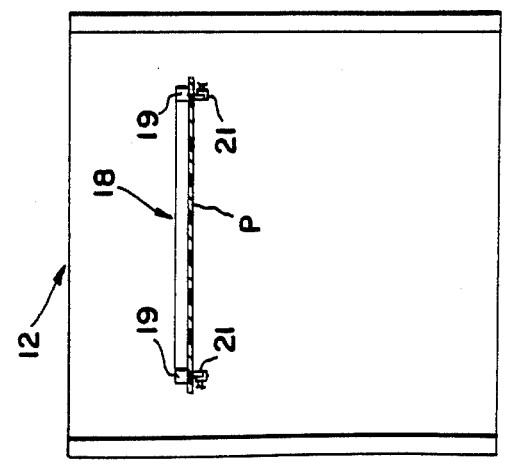
FIG.6

DIFFERENTIAL PRESSURE THERMOFORMING AND FOAM INJECTION PROCESS AND APPARATUS

BACKGROUND OF THE INVENTION

The present invention relates to the field of manufacturing processes for polymeric composition articles, and more particularly to certain improvements in differential pressure thermoforming machinery which permits such machines to inject a resinous fluid foam into a cavity or pocket formed in a differential pressure molded sheet while the sheet is still in the mold.

DESCRIPTION OF THE PRIOR ART

It has been commercial practice to manufacture or fabricate synthetic plastic, interior door panels, having armrests, in separate thermoforming and injection molding machines, the latter charging an expanded thermoplastic to a pocket, molded in the panel to project therefrom as the armrest in a vehicle such as an automobile.

Typical machinery of the type indicated is illustrated in some of the following U.S. Pat. Nos.

| Re. 30,130 | Edwards | 3,983,196 | Gray |
| 3,025,566 | Kostur | 3,988,789 | Blount |
| 3,779,687 | Alesi | 4,031,176 | Molbert |

Such manufacturing methods have necessitated that differential pressure formed, interior trim panels be removed from the thermoformer, and stacked or warehoused, before being moved to the injection molding machine. Labor cost and time is involved in the handling and transfer of the parts, and a number of rejects resulted from the storage and handling operations, due to the inadvertent handling damage which occurred.

SUMMARY OF THE INVENTION

The present invention is concerned with a differential pressure thermoforming machine having a differential pressure mold cavity in aligned, confronting relationship with a complementary head which includes both a plug assist and a foam injection assembly. Mechanism is provided for orienting the head so that, in one of its positions, it is the plug assist which confronts the cavity in the mold when the mold parts are closed on the plastic sheet, and, in another position, it is the foam injecting assembly which confronts the pocket formed in the thermoformed sheet and the mold cavity which supports it. Mechanism is incorporated for moving the plastic sheet from a loading station to an oven, and thence into a composite differential pressure forming and foam injection station.

OBJECTS OF THE INVENTION

One of the prime objects of the present invention is to provide a differential pressure thermoforming machine which has a single station, capable not only of molding the armrest pocket projection in the interior trim panel, but also capable of injecting the resinous foam composition into the pocket behind a suitable rigid insert which is placed in the mouth of the armrest pocket.

Another object of the invention is to provide a more efficient system of the character described, which eliminates the cost involved in the storage and handling of partly-fabricated trim panels, and thus promotes cost savings which lead to decreased manufacturing costs.

Still another object of the invention is to provide a system which can reliably fabricate such parts and similar parts in a more easily controlled environment.

Still a further object of the invention is to provide a system which can be operated on a high-production schedule to furnish high quality parts to the automotive and other industries.

Other objects and advantages of the invention will become apparent with reference to the accompanying drawings:

IN THE DRAWINGS

FIG. 1 is a schematic, top plan view of a typical machine;

FIG. 2 is side elevational view thereof;

FIG. 5 is a sectional elevational view of a product which is typically formed in the apparatus disclosed;

FIGS. 6-12 are progressive, schematic front elevational views illustrating progressive steps in the fabrication of the product disclosed in FIG. 5;

FIG. 13 is an enlarged, fragmentary sectional view illustrating the manner in which the foam layer is injected by the foam injection nozzle;

Figure 3:
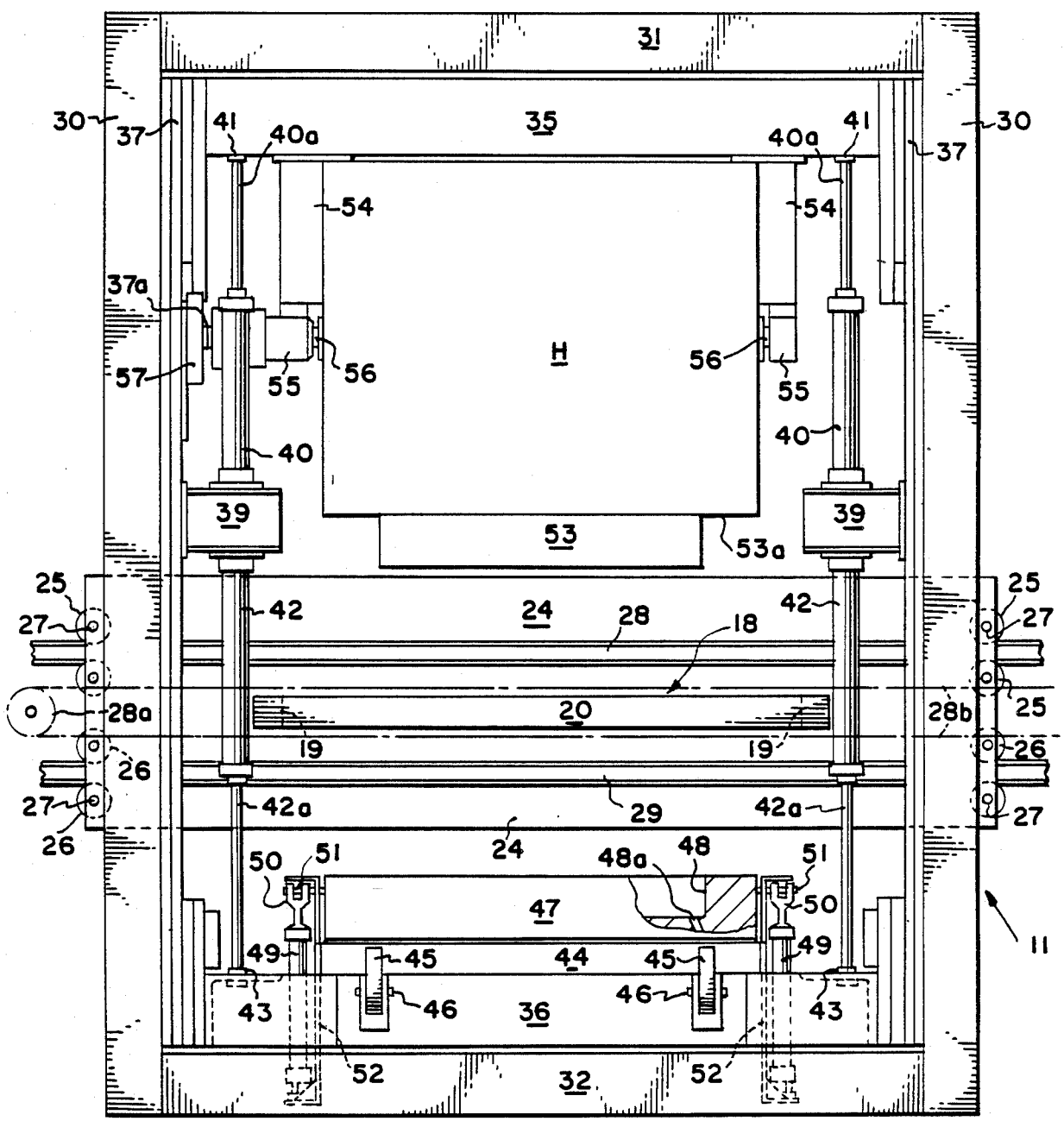
FIG. 3 is an enlarged, front elevational view of one of the "form and foam" stations which are identified in FIGS. 1 and 2.

Referring now more particularly to the accompanying drawings, and in the first instance to FIGS. 1 and 2, a typical machine is illustrated which includes a frame, generally designated F. The frame F defines a central oven station, generally designated 10, flanked by a pair of alternately operated "form and foam" stations, generally designated 11, which are themselves flanked by a pair of sheet load stations 12. It is to be understood that a synthetic plastic sheet, loaded to a carrying carriage or cart at the left-hand load station in FIGS. 1 and 2, is moved first to the oven 10, where it is heated to a thermoforming temperature by upper heaters 13 and lower heaters 14, which are supported by the oven frame structure 15. When the thermoplastic sheet has been heated to deforming temperature at the oven station 10, the cart returns it to one of the "form and foam" stations 11 for the thermoforming and foam injecting operations which presently will be described.

While the sheet loaded at, for example, the left-hand load station 12 is disposed at the left-hand "form and foam" station 11, a second plastic sheet or web, which has been loaded to a cart at the right-hand load station 12, is moved to the oven station 10 and heated to thermoforming temperature. The second sheet is fully heated by the time the forming and foam injecting operation is completed at the left-hand "form and foam" station 11, and the second sheet is then moved back to the right-hand "form and foam" station 11 for processing there.

Thus, sheets loaded at the left and right-hand load stations are alternately heated at the central oven station 10, without any loss of oven time, prior to being moved to a separate "form and foam" station 11. It is to be understood that the products formed are manually unloaded at the separate "form and foam" stations 11 by the operator responsible for loading the sheets at the respective load stations 12. Since the present invention is particularly concerned with the method practiced, and the apparatus used, at the "form and foam" stations, and these, in the system employed, are identical, the following description of one such "form and foam" station will suffice.

In FIG. 5, we have shown a typical product which may, for purposes of example, be considered to comprise an interior automobile door trim panel with a molded-in arm rest projection. The panel formed comprises a sheet of moldable thermoplastic material P, typically on the order of one quarter inch ($\frac{1}{4}$") in thickness, having an armrest-forming pocket 16 differential pressure molded therein. The surface a of the plastic panel P is the surface which faces the door shell when the panel P is installed in the vehicle, and the surface b forms the visible interior surface of the door.

Provided in the pocket 16, is a layer 17 of preferably a semi-rigid plastic foam which is cured "in situ" after being injected into the pocket 16 in liquid form behind a rigid plastic insert block B.

Figure 4:
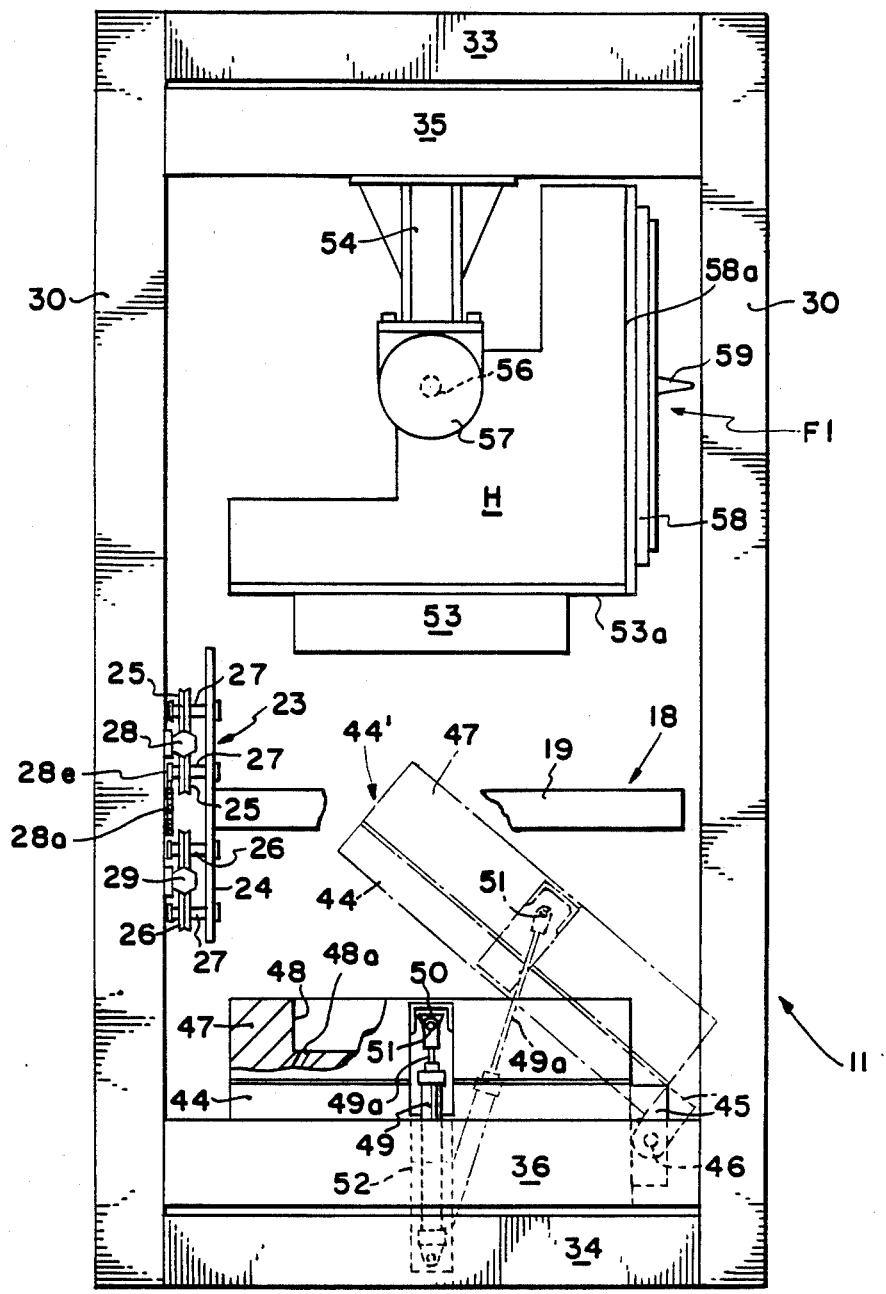
FIG. 4 is an end elevational view of the "form and foam station" depicted in FIG. 3 which discloses schematically the manner of supporting the plastic sheet or web-carrying cart or carriage for travel, the chain lines indicating a tilted position of the female mold assembly which permits ready unloading of the product therefrom.
Figure 4A:
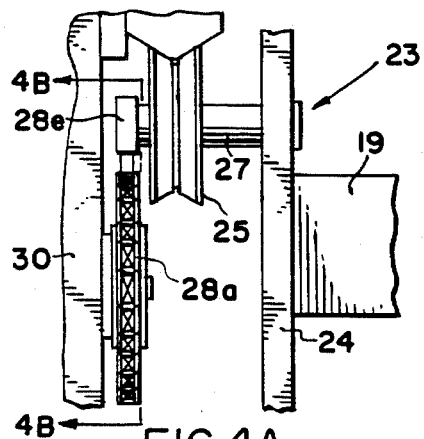
FIG. 4A is an enlarged, fragmentary, sectional front elevational view illustrating cart driving mechanism.
Figure 4B:
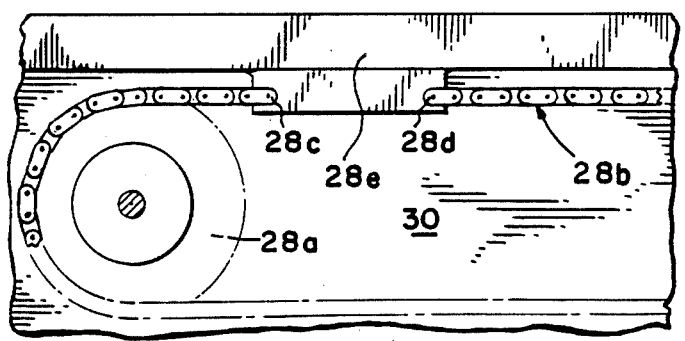
FIG. 4B is a fragmentary, side elevational view of parts of the cart driving mechanism.

FIGS. 3 and 4 particularly disclose the operating elements which comprise either of the "form and foam" stations 11, and now will be considered in more detail.

The sheet-carrying car or cart, generally designated 18 in FIG. 4, may comprise the usual open, rectangular frame made up of end members 19 (see FIGS. 3, 4 and 14), connected by front and rear side members 20. Clamp plates 21 associated with each of the members 19 and 20, are swung up from the released position shown at 21', to the sheet clamping position illustrated in FIG. 14, by a series of double acting air cylinders 22, carried by the cart. This structure is described in the present assignee's U.S. Pat. No. 4,555,377, issued Nov. 26, 1985. FIGS. 3 and 4 illustrate the manner in which the cart 18 is supported in cantilever disposition by a cart supporting and conveying assembly, generally designated 23 (FIG. 4), which includes plate 24. Plate 24 rotatably mounts upper and lower pairs of guide rollers 25 and 26, as via shafts 27, the rollers 25 and 26 guiding on rails 28 and 29, which extend from the end portion of each load station 12 across each "form and foam" station 11, and on into the oven station 10.

Provided to drive the cart 18 in any suitable manner, is a chain drive system which, for the sake of simplicity, may be considered to comprise a drive sprocket 28a (FIG. 3) driven by a suitable reversing motor via the usual gear reduction box. A drive chain 28b trained around the sprocket 28a, and connected at its ends as at 28c and 28d to a rail 28e carried by shafts 27 which are fixed to cart plate 24, moves the cart 18 in a linear path on rails 28 and 29 in a manner which presently will be described in more detail.

As FIGS. 3 and 4 particularly indicate, the "form and foam" station 11 comprises upright frame columns 30 at its four corners, connected by upper and lower side rails 31 and 32, respectively, and upper and lower end rails 33 and 34, respectively. Upper and lower platens 35 and 36 are mounted for vertical travel along the columns 30 between upper and lower positions on bearing tracks 37, there being suitable rollers (not shown) mounted by the platens 35 and 36 which travel along the tracks 37.

Provided at each side of the columns 30, and fixedly supported thereby, are cylinder mounts 39 (as shown in FIG. 3). Double acting, solenoid operated, air or hydraulic cylinders 40, which are fixedly mounted to the cylinder mounts 39, have their piston rods 40a connected to the upper platen as at 41. Similarly, double acting, solenoid operated, air or hydraulic cylinders 42, which are fixed to the lower side of the cylinder mounts 39, have their piston rods 42a connected to the lower platen 36 at 43. In both FIGS. 3 and 4, the platens 35 and 36 are shown in the fully vertically spread position.

Mounted on the lower platen 36, as shown in FIG. 4, is a pivot mount plate 44, at one end of which a pair of brackets 45 are fixed. The brackets 45 at each end of the plate 44 are pivoted as at 46 to allow plate 44 to pivot to the 44' position, as shown. The plate 44 rigidly mounts lower mold 47, which has a mold cavity 48 with the usual suction ports 48a leading to a vacuum manifold and a suitable vacuum source, such as a vacuum pump, for the purpose of creating a differential pressure within the cavity 48 at the desired time.

Provided to tilt the mold 47 about the pivot 45, as illustrated by the chain lines in FIG. 4, are suitable double acting, solenoid operated hydraulic cylinders 49, which have piston rods 49a with clevis ends 50 pivotally connected to pins 51 on mold 47. The lower ends of cylinders 49 are connected to brackets 52, which are fixed to lower platen 36, but depend to a position below it.

Provided above the mold 47, and supported by the upper platen 35, is a pivotal "form and foam" head assembly generally designated H, which carries a mold-closing male mold member 53 which is sized to enter the mold cavity 48 and function as a plug assist, the male mold 53 being secured in position on a mold mount-surface 53a by connecting members in any suitable manner. Depending from the platen 35 are posts 54 (FIG. 4), mounting bearings 55. Shafts 56 are received by the bearings, and are fixed to the head assembly H. Provided to rotate the one shaft 56 back and forth through a 90° angle, is a rotary hydraulic motor 57, carried on the upper platen 35, the hydraulic actuator 57 having an output shaft 57a which is coupled to the driven shaft 56 in any suitable manner.

Mounted in 90° removed position from the male mold member 53 on a foam injection supporting surface 58a, is a foam injection assembly generally designated FI. As FIG. 13 perhaps more particularly discloses, the assembly FI may include a container or manifold 58 for a mixture of reacting liquids which are maintained under pressure therein, along with the conventional injecting means including the injecting nozzle 59. The foam material injected can be a heat plastified resinous composition, such as polystyrene or polyvinylchloride with an incorporated blowing agent, which foams under atmospheric pressure, or a mixture of reacting liquids such as isocyanate and polyol. The injecting assembly valve system V (FIG. 15) moves a predetermined charge of the settable fluid mixture through the nozzle 59. Various methods of injecting a settable structural foam in fluid form are known, such as, for instance, the method and apparatus disclosed in U.S. Pat. No. 3,983,196.

It is necessary that the foam injection assembly "seal" to the plastic sheet P prior to the injection step. Provided on the mold confronting surface 60 (FIG. 5) of the foam injecting assembly FI is a perimetral groove 61 within which a resilient seal 62 is secured. Similarly, a perimetral groove 63 is provided in the surface 60 around nozzle 59, as shown, and may likewise comprise a suitable resilient member such as an O ring or the like. For a purpose which will later be described, a recess or port 63a is provided in the surface 60 and leads to atmosphere.

THE METHOD OF OPERATION

FIGS. 6–12 particularly demonstrate the method of operation. The various operating parts are preferably limit switch controlled in a conventional manner. Of course a programmable controller may also be used to operate the various drives in sequence.

Figure 15:
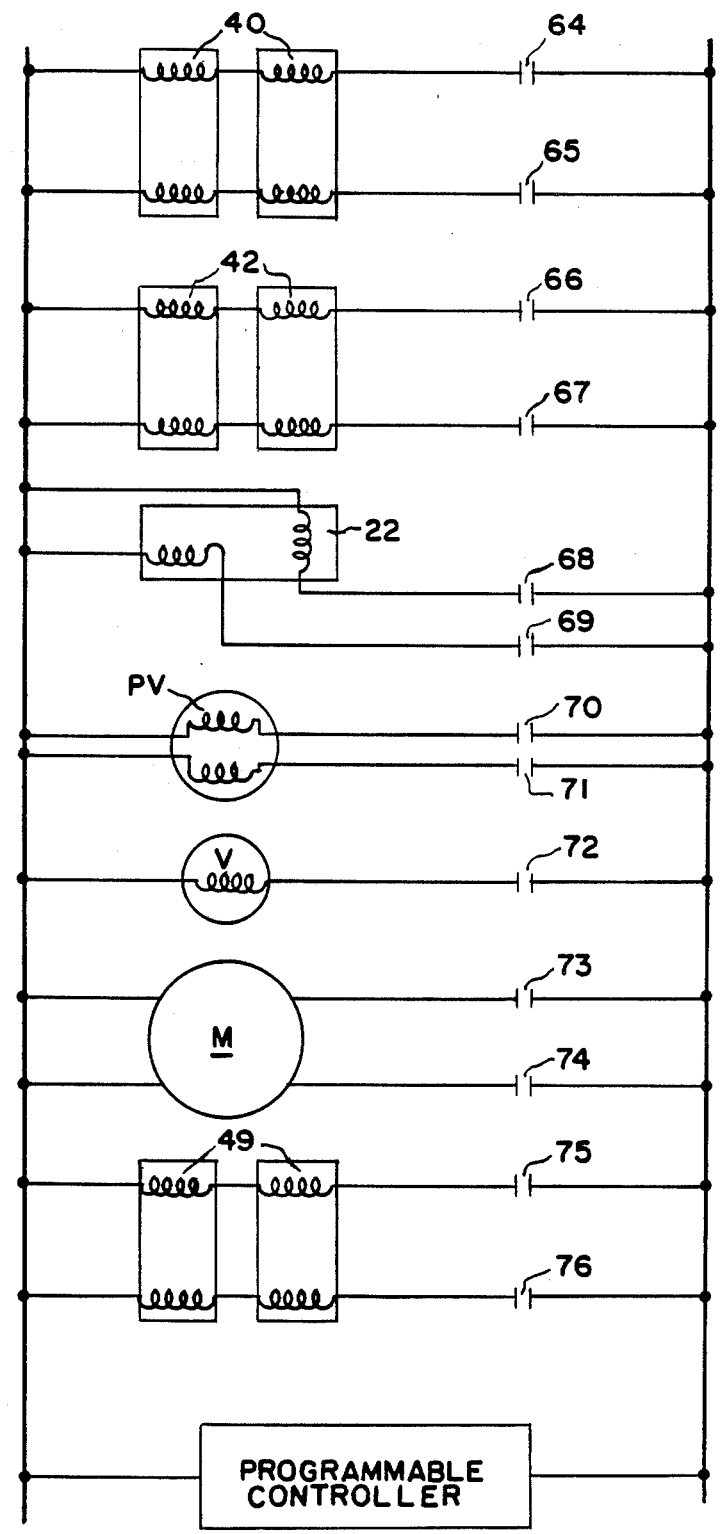
FIG. 15 is a view schematically illustrating a typical electrical control system.

For purposes of convenience a schematically illustrated control system is depicted in FIG. 15. The contacts 64, when closed, energize retract solenoids to lower platen 35, and the contacts 65, when closed, operate the advance solenoids of cylinders 40 to extend the piston rods 40a and restore the platen 35 to up position. Similarly, the contacts 66, when closed, operate the solenoids which retract the piston rods 42a of cylinders 42 to raise the platen 36, and the contacts 67, when closed, energize the solenoids of cylinders 42 to extend the piston rods 42a and return the platen 36 to lowered position.

There are, of course, a multitude of cylinders 22 for releasing the clamps 21 but, for purposes of convenience, only one has been shown in FIG. 15. Contacts 68 are provided for energizing the advance solenoids of cylinders 22 and moving the piston rods 22a of cylinders 22 to clamped position. Contacts 69, when closed, energize the retract solenoids of the cylinders 22 to move the clamps 21 to the 21' position and release the plastic sheet P.

The pump valve PV for supplying the fluid motor 57, may be assumed to be a solenoid operated valve. When contacts 70 are closed, the solenoid valve PV is energized to direct fluid to cause shaft 56 to be driven in a direction to revolve the head H 90° in a clockwise direction in FIG. 4. Similarly, when contacts 71 are closed, the solenoid operated valve PV directs fluid in a direction to drive the shaft 56 in the return direction.

The valve V for controlling the passage of foam material, may be a solenoid operated, spring-returned valve, which, when contacts 72 are closed on a timed basis, operates the valve V to open and deliver a predetermined charge through nozzle 59.

The reversible motor M has contacts 73, which, when closed, operate the sprocket 28a to drive in one direction, and contacts 74 which, when closed, operate the motor M to drive in the opposite direction. The piston rods 49a of double acting cylinders 49 are extended when the advance solenoids of cylinders 49 are energized with the closing of contacts 75, and retracted when the retract solenoids of cylinders 49 are energized with the closing of contacts 76.

Figure 14:
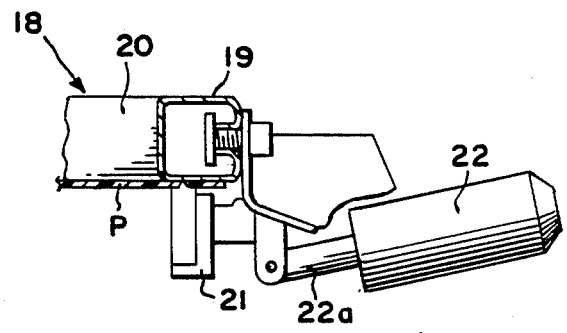
FIG. 14 is an enlarged, schematic, fragmentary view illustrating typical sheet clamping mechanism.

FIG. 6 depicts the starting position in which the sheet of plastic P has been, for example, manually or semi-automatically loaded to the cart 18, cylinders 22 having been operated to swing the clamp members 21 from the position 21' shown in FIG. 14, to the sheet clamping position. At this point, sprocket 28a is energized by motor M to move the sheet carrying cart 18 from left to right along the sheet line path indicated at c in FIG. 2, through the "form and foam" station 11, and into the oven station 10 which is shown schematically in FIG. 7. After a time interval during which the plastic sheet P is heated to differential pressure molding temperature by the heaters 13 and 14, the drive sprocket 28a is operated reversely to return the cart 18 to the "form and foam" station 11, as illustrated in FIG. 8. At this time, the platens 35 and 36 are in spread-apart position, and both the head H and the mold 47 are in spread-apart position, removed from the cart 18, and the path c of cart travel. The male mold 53 will be in vertically confronting relation with the mold cavity 48, and in vertical alignment therewith.

Figure 9:
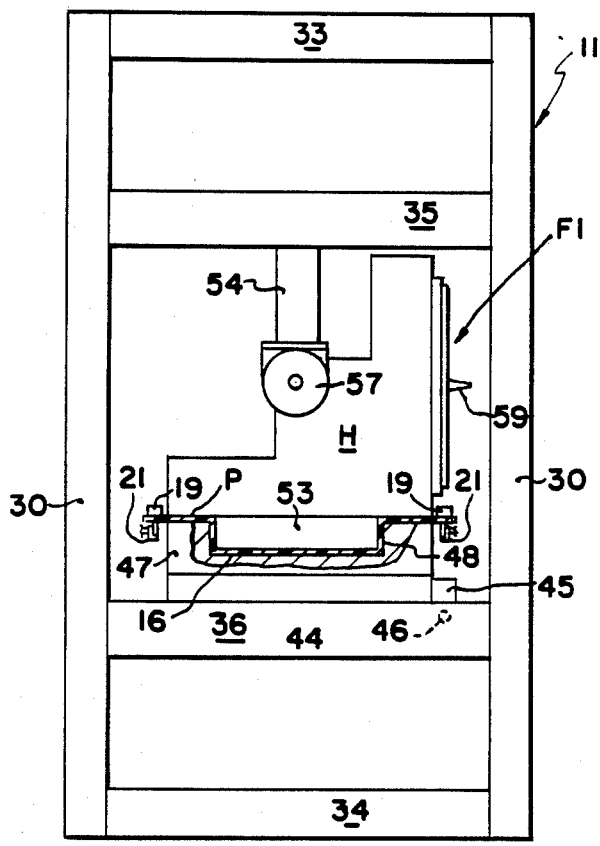

FIG. 9 illustrates the next step in the operation in which cylinders 40 and 42 have been activated to retract their piston rods 40a and 42a, respectively, and bring the male mold plug assist 53 first into engagement with the plastic sheet P, and then on into the mold cavity 48 to assist in displacing the heated plastic sheet P into the mold cavity 48. At this time, suction forces are utilized in the usual manner via ports 48a to draw the plastic sheet into intimate engagement with the contours of the mold cavity 48 to form the armrest pocket 16 therein. Air under pressure could also be supplied to assist from a suitable source such as an air manifold connected with ports in the male mold 53 and a source of air under pressure.

Figure 10:
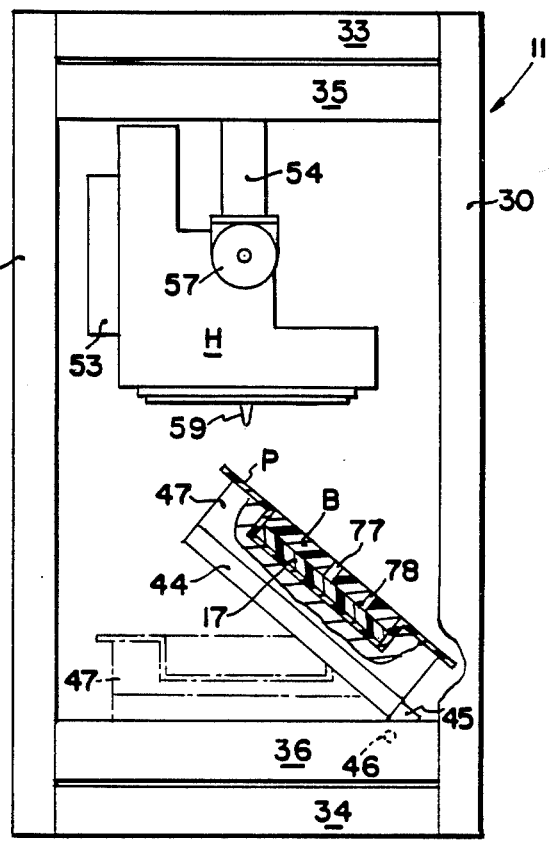

As FIG. 10 illustrates, after a predetermined relatively short time for cooling of the plastic web P, the piston rods 22a of cylinders 22 are retracted to open clamps and release the molded plastic sheet P. Cylinders 40 and 42 are then activated to move the head H and the mold 47 to the retracted positions once again, the released sheet P remaining in mold 47. At this time, cylinders 49 are activated to pivot the mold 47 to the position shown in chain lines in FIG. 4, and in solid lines in FIG. 10. An operator, standing at the front of the "form and foam" station, thus finds the mold 47 in an access position in which he can easily insert a rigid, preferably plastic, block B, having a central opening 77 for accommodating the injection nozzle 59.

Also provided in the block B is a port 78 which, when the foam injection assembly FI is in engagement with the block B, as shown in FIG. 13, aligns with the port 63a leading to atmosphere, and communicates the space 79 beneath block B with port 63a. The space 79 is left beneath block B for the purpose of receiving the foam which is supplied via nozzle 59.

Figure 11:
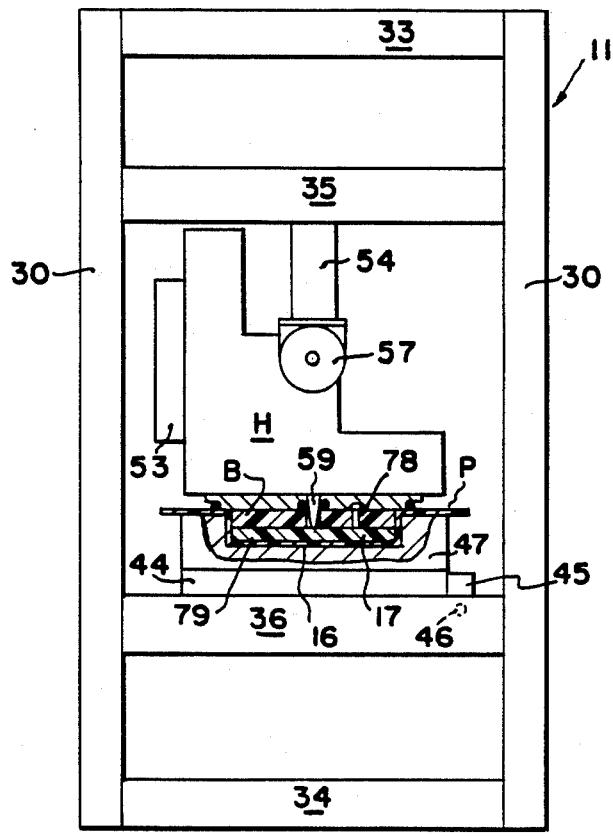

Once block B is inserted, cylinders 49 are operated to retract their piston rods 49a, and lower the mold 47 to the FIG. 4 position. At this time, the hydraulic motor 57 is actuated to revolve shafts 56 and head H through a 90° arc of revolution and dispose the foam injecting assembly FI in vertically confronting relationship with the mold cavity 48 and the pocket armrest 16 contained thereby, as indicated in FIG. 11. The cylinders 40 and 42 are then actuated to move the platens 35 and 36 relatively toward one another once again, to the position illustrated in FIG. 11, wherein nozzle 59 is inserted into the central opening 77, in a position to dispense the foam or foam forming mixture into the space 79. This occurs when the parts reach the position shown in FIG. 11, and the measured charge of material is injected via valve V into the cavity or space 79, within pocket 16, to provide the settable layer of plastic foam 17 therein. Air being forced from the space 79 in this injection and foam forming operation proceeds out ports 78 and 63a, to atmosphere. Coolant circulation passages (not shown) in mold 47 are controlled to provide fast curing of the foam layer 17.

Figure 12:
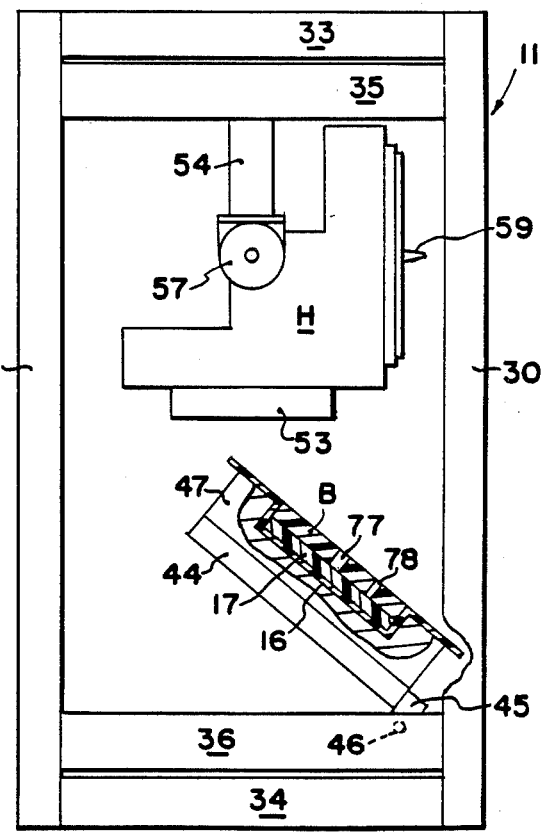

With the completion of the foam charging injection, the cylinders 40 and 42 are once again activated to move the platens 35 and 36 to retracted position, and the head H and mold 48 to separated position, at which time motor 57 is operated reversely to move the head H in a return 90° arc of revolution to the position shown in FIG. 12. Cylinders 49 are then operated to again dispose the mold 47 in the tilted, operator-accessible position. After these operations, and any additional time required for curing of the foam 17 in situ, the operator can manually remove the product from the mold 47, and, once mold 47 is returned to horizontal position, the cart 18 can be returned to the load station, for the loading of another plastic sheet to be processed.

The system described can utilize a wide variety of thermoplastic sheets P such as, for example, polyvinyl chloride, polystyrene, the ABS resins, and many others. The synthetic resinous foam composition may be polyurethane, polystyrene, various acrylics, and other suitable materials.

While one embodiment of the invention has been described in detail, it will be apparent to those skilled in the art that the disclosed embodiment may be modified. Therefore, the foregoing description in all aspects is to be considered exemplary, rather than limiting in any way, and the true scope of the invention is that defined in the following claims.

What is claimed is:

1. The method of fabricating a plastic web, having a differential pressure formed pocket therein which contains a cured foam bed, with a differential pressure thermoforming machine having a female mold assembly, with a female mold cavity; an opposing mold assembly having a web contacting portion surrounding said cavity; mechanism mounting the mold assemblies for relative movement along a mold opening and mold closing axis to spread apart and mold closed positions; a carriage for delivering a clamped in place, heated web of plastic between the mold assemblies when in spread apart position; mechanism for creating a differential pressure in the mold assemblies in the mold closed position; and a foam injection head with a foam injection nozzle member on the opposing mold assembly separated perimetrally from the web contacting portion; the steps of
  a. moving the mold assemblies relatively to mold closed position and differential pressure forming said pocket in the web;
  b. releasing the web from the carriage so that it is carried in the female mold cavity and moving the mold assemblies relatively to spread them apart;
  c. then orienting the opposing mold assembly to a position in which the web contacting position is removed from alignment with said axis and the foam injection member is simultaneously aligned with said axis, and with the web pocket carried by the mold cavity;
  d. relatively moving mold assemblies to mold closed position and sealing the plastic web around the pocket;
  e. injecting plastic foam material carried in said head into said web pocket; and
  f. returning said mold assemblies to mold separated position.

2. The method of claim 1 wherein, just prior to the time of the foam injecting head is moved into sealed relation with the plastic web, an insert block, having an opening for accommodating the foam injecting member is inserted into the pocket to fill the pocket except for a space behind the insert block.

3. The method defined in claim 1 wherein the mold assemblies are restored to spread-apart position after the foam injection step, after a dewll time for curing the foam within the pocket.

4. The method defined in claim 2 wherein the female mold assembly is moved to vertically tilted position to facilitate insertion of said block, and then restored to horizontal position for the foam injection operation.

5. The method of claim 4 wherein the female mold assembly is again moved to vertically tilted position at the end of the foam injection step, and after the mold assemblies have been restored to spread-apart position, to facilitate unloading of the part formed.

6. In a differential pressure, thermoforming machine having a female mold assembly with a female mold cavity for molding a thermoplastic web; an opposing mold assembly, having a perimentral surface with a web contacting male plug assist portion thereon, cooperable with said mold cavity; platen means mounting at least one of said mold assemblies for relative movement along a mold opening and mold closing axis to dispose said mold assemblies in spread apart and mold closed relative positions; power drive means for driving said platen means; means for delivering a heated web of plastic between said mold assemblies when in spread apart position; means for creating a differential pressure on opposite sides of the web when the mold assemblies are in the mold closed position to cause the web to move into intimate contact with the mold cavity and form a configured pocket in said web; means for then operating said power drive means to cause relative movement of said mold assemblies toward spread apart position; said opposing mold assembly having a foam injection member thereon, angularly displaced from said web contacting male portion and mounted onto the perimeter of said opposing mold assembly; indexable means mounting said opposing mold assembly for swinging movement, from a position in which said web contacting male portion is axially aligned with said female mold cavity, to a position in which said foam injection member is axially aligned with said female mold cavity; actuable means for operating said indexable means and orienting the said opposing mold assembly to axially align the said foam injection member with the mold cavity following operation of the means for creating a differential pressure to form said configured pocket, and following relative movement of the mold assemblies toward spread apart position; means for operating said power drive means once said foam injection member is in axially aligned position, to drive the platen means to relatively move the mold assemblies axially to a mold closed position wherein said foam injection member is adjacent the pocket in a position to inject plastic foam material into said pocket: means carried by said opposing mold assembly for delivering said material to said foam injection member; and means for operating said power drive means to again relatively move said mold assemblies to spread apart position.

7. In a differential pressure, thermoforming machine having a female mold assembly with a female mold cavity for molding a thermoplastic web; an opposing mold assembly, having a web contacting portion thereon for surrounding said cavity; platen means mounting at least one of said mold assemblies for relative movement along a mold opening and mold closing axis to dispose the said mold assemblies in spread apart and mold closed relative positions; power drive means for driving said platen means between said positions; means for delivering a heated web of plastic between said mold assemblies when they are in spread apart position; means for creating a differential pressure in said mold assemblies when the mold assemblies are in the mold closed position to cause the web to move into intimate contact with the mold cavity and form a configured pocket in said web; said opposing mold assembly having a foam injection nozzle member thereon, perimetrally offset from said web contacting portion; indexable means mounting said opposing mold assembly for orienting movement, from a position in which said web contacting portion is axially aligned with said female mold and the mold cavity therein, to a position in which said foam injection member is axially aligned with said female mold assembly and the mold cavity therein; means actuating said power drive means to move the mold assemblies to mold closed position; actuable means for operating said indexable means and orienting the said opposing mold assembly to remove the web contacting portion from alignment with said axis and simultaneously align the said foam injection member with the mold cavity following operation of the means for creating a differential pressure to form said configured pocket; means operating said power drive means to drive the platen means to relatively move the mold assemblies axially to a mold closed position wherein said foam injection member is adjacent the pocket in a position to inject plastic foam material into said pocket, means carried by said opposing mold assembly for delivering said material to said foam injection member; and means for operating said power drive means to then relatively move said mold assemblies to spread apart position.

8. The machine of claim 7 wherein a carriage having a clamp frame with web gripping clamps thereon is travelable between said mold assemblies when the mold assemblies are in spread apart position to deliver said web between said mold assemblies to a mold station; means is provided for moving said carriage between a web loading station, a web heating station, and between said mold assemblies; and means is provided for operating said clamps to release said clamps after said thermoforming operation and before said mold assemblies are moved thereafter relatively to separated position.

9. The machine of claim 8 wherein said female mold assembly is swingably mounted to move from a horizontal disposition normal to said axis to a vertically inclined tilted disposition; power operated female mold assembly tilting means is operable to move said female mold assembly to and from said dispositions; and means operates said mold tilting means to swing said female mold assembly to vertically tilted position after said mold assemblies are separated, and before said power drive means is operated to relatively move the mold assemblies to sealed position for foam material injection.

10. The machine of claim 1 wherein said mold tilting means restores said female mold assembly to horizontal position before said mold assemblies are brought to closed position for the foam injecting operation.

11. The machine of claim 10 wherein, upon separation of said mold assemblies, after said foam injection, said mold tilting means causes said female mold assembly to move to vertically tilted position to facilitate removal of the product formed.

12. The machine of claim 7 wherein said opposing mold assembly is mounted for swinging movement generally about a horizontal axis; said web contacting portion comprises a plug assist male member, said male member and foam injecting head are disposed on the perimeter of the mold assembly angularly displaced from one another radially; and power operated means is operable for swinging said head to positions in which, first said male member, and then said foam injection head, are aligned with said axis of mold movement.

13. The machine of claim 8 wherein said loading station is disposed on one side of said mold station and said heating station is in line therewith on the opposite side of said mold station; and a drive assembly is controlled to move the carriage and the clamp frame from the loading station through the mold station to the heating station; thence back to the mold station, and thence back to the loading station.

* * * * *